(12) United States Patent
Alneyadi et al.

(10) Patent No.: US 12,514,827 B1
(45) Date of Patent: Jan. 6, 2026

(54) COATED ZEOLITIC IMIDAZOLATE FRAMEWORK (ZIF-8) AS AN EFFICIENT CARRIER FOR THE CYCLOHEPTYLAMINE HYDROCHLORIDE FOR THE TREATMENT OF DIABETES

(71) Applicant: United Arab Emirates University, Al Ain (AE)

(72) Inventors: Shaikha Alneyadi, Al Ain (AE); Abdu Adem, Al Ain (AE); Mariyam Khalid, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 18/952,635

(22) Filed: Nov. 19, 2024

(51) Int. Cl.
*A61K 9/50* (2006.01)
*A61K 31/13* (2006.01)
*A61K 45/06* (2006.01)

(52) U.S. Cl.
CPC ............ *A61K 9/5073* (2013.01); *A61K 31/13* (2013.01); *A61K 45/06* (2013.01)

(58) Field of Classification Search
None
See application file for complete search history.

(56) References Cited

U.S. PATENT DOCUMENTS 11,091,426 B1 * 8/2021 Adem .................. C07C 279/16

OTHER PUBLICATIONS

Alneyadi et al., Molecules (2020), 25, 4313, 19 pages.*
Vahed et al., Journal of Drug Delivery and Technology 49 (2019), pp. 570-576.*
Ibekwe et al., Pharmaceutical Research (2008), 25(8), pp. 1828-1835.*

* cited by examiner

*Primary Examiner* — Brian J Davis
(74) *Attorney, Agent, or Firm* — MH2 Technology Law Group, LLP

(57) ABSTRACT

A novel controlled drug delivery system (DDS) for treating type 2 diabetes that combines an active compound comprising Cycloheptylamine hydrochloride (C7), an oral antihyperglycemic agent for treating type II diabetes, within an alginate-coated Metal-Organic Framework (MOF) structure, ZIF-8 (C7-ZIF-8@Alginate). The system enhances drug solubility, stability, and controlled release of C7 by utilizing the unique properties of MOFs, such as their coordinately unsaturated centers and large surface area, thus enhancing the drug's effectiveness, leading to improved patient care.

11 Claims, 11 Drawing Sheets

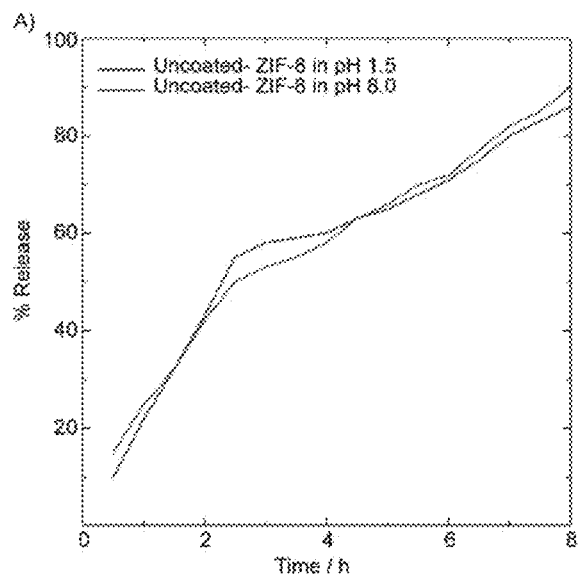
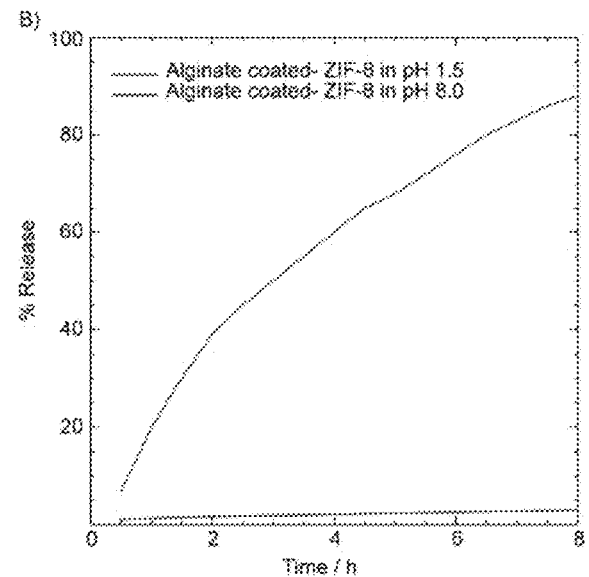
FIG. 13A          FIG. 13B
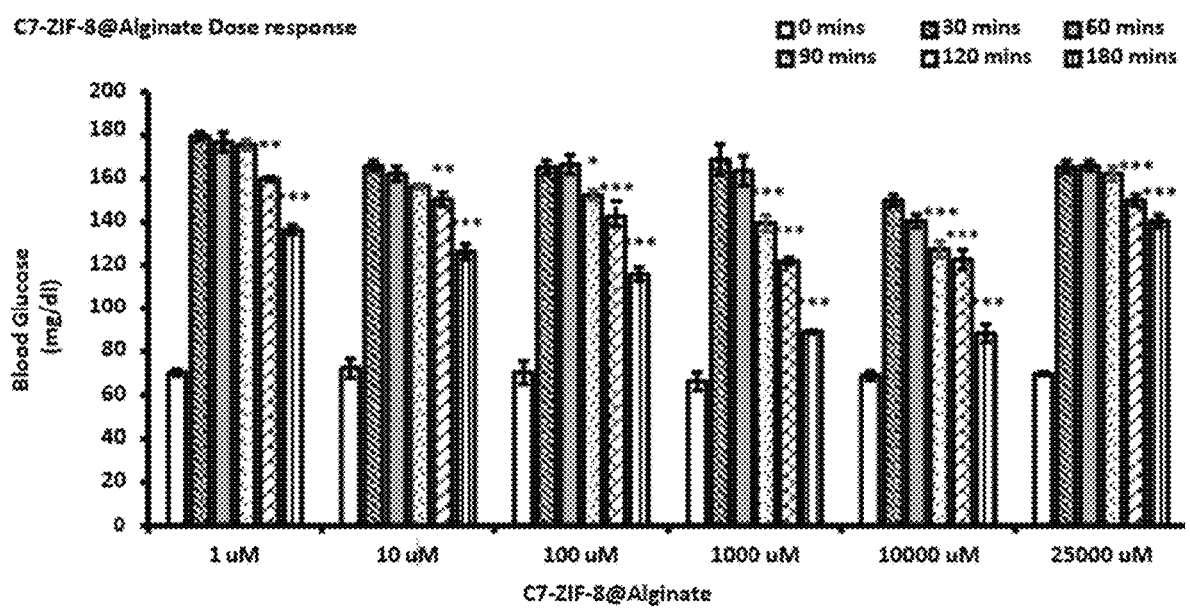
FIG. 14

COATED ZEOLITIC IMIDAZOLATE FRAMEWORK (ZIF-8) AS AN EFFICIENT CARRIER FOR THE CYCLOHEPTYLAMINE HYDROCHLORIDE FOR THE TREATMENT OF DIABETES

TECHNICAL FIELD

The present invention relates to encapsulation of Cycloheptylamine hydrochloride (C7) within a ZIF-8 MOF, a pH-sensitive sodium alginate coating for controlled, targeted release in the intestines in the treatment of type 2 diabetes.

BACKGROUND

Diabetes mellitus is characterized by elevated blood glucose levels, which can result from either insufficient insulin secretion or insulin resistance. This condition has a long history dating back to ancient times. The majority of diabetes cases, specifically 90-95%, fall under the noninsulin-dependent type 2 diabetes mellitus category.

Various pathological mechanisms contribute to the development of this metabolic disorder. According to the International Diabetes Federation (IDF), diabetes is emerging as a global epidemic, with the estimated number of people living with diabetes increasing by 62% in the past decade worldwide. The IDF Diabetes Atlas 10th edition report from 2021 reveals that there are 537 million adults aged 20-79 living with diabetes, and this number is projected to rise to 643 million by 2030 and 783 million by 2045 [1, 2]. The United Arab Emirates is among the 21 countries and territories in the IDF MENA region. The IDF's 2021 report indicates that the MENA region has 73 million people with diabetes, a number expected to increase to 135.7 million by 2045 [3]. The depletion of beta cells, which are responsible for maintaining normal blood sugar levels and compensating for insulin resistance, is a critical factor in the development of this condition [4]. Additionally, chronic diabetes leads to persistent high blood sugar levels and the excessive production and build-up of advanced glycation end products (AGEs), which significantly contribute to the pathogenesis of diabetes-related complications, either directly or indirectly through various pathways [5].

Current treatment options for diabetes include oral anti hyperglycemic medications with diverse mechanisms of action, such as insulin sensitizers like metformin and thiazolidinediones, insulin secretagogues like sulfonylureas and meglitinides, and α-glucosidase inhibitors. According to the American Diabetes Association, diabetes treatment typically begins with initial monotherapy and may progress to two-drug therapies, eventually leading to multidrug therapies in more complex cases [6].

Synthetic medicinal compounds are crucial for healthcare due to their role in innovative drug development, enabling targeted therapies and improving bioavailability. They allow for drug customization, making treatments more effective and adaptable to individual patient needs. These compounds have facilitated the development of treatments for previously incurable diseases, while also aiding in disease prevention and control, particularly in the case of vaccines and antiviral drugs. Additionally, synthetic compounds contribute to cost-effective healthcare solutions by enabling mass production, ensuring affordability and accessibility. Continuous advancements in synthetic medicinal chemistry drive ongoing medical progress, offering hope for future treatments and shaping the landscape of healthcare and medical science. Conventional methods struggle with maintaining optimal drug levels and targeted delivery. Therefore, there is an urgent need for a safe and efficient controlled drug delivery system in the treatment of diabetes.

BRIEF DESCRIPTION

The present invention discloses a novel controlled drug delivery system using MOFs, focusing on enhancing C7's bioavailability, stability, and targeted delivery, showcasing the innovative applications of MOFs in diabetes pharmacology.

In one aspect, disclosed herein is a system for targeted delivery that comprises a pH-sensitive alginate coating for controlled release of an active compound in the intestines. In embodiments, the coating comprises a Metal-Organic Framework (MOF) encapsulating the active compound for the treatment of type 2 diabetes. In preferred embodiments, the active compound is cycloheptylamine. In more preferred embodiments, the active compound is cycloheptylamine hydrochloride (C7).

In another aspect, disclosed herein is a pharmaceutical composition for treating type 2 diabetes that comprises an active compound encapsulated within a pH-sensitive sodium alginate coating for controlled release at a basic pH. In embodiments, the coating comprises a Metal-Organic Framework (MOF), wherein the MOF comprises a zeolitic imidazolate framework 8 (ZIF-8), wherein the basic pH ranges from about 5.7 to about 7.4.

In a further aspect, disclosed herein is a method of treating type 2 diabetes in a subject in need thereof that comprises administering an effective amount of the pharmaceutical composition.

In certain embodiments, cycloheptylamine hydrochloride (C7) is coated within a zeolitic imidazolate framework 8 (ZIF-8) with pH-sensitive sodium alginate (C7-ZIF-8@Alginate).

In preferred embodiments, C7-ZIF-8@Alginate remains stable in the acidic stomach environment. In more preferred embodiments, the pH-sensitive coating releases C7 at basic pH, where the basic pH ranges from about 5.7 to about 7.4. In preferred embodiments, the active compound of the present invention is released in the basic environment of the intestines.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 13A-B illustrate the measured amounts of C7 release from uncoated-ZIF-8 in PBS, under simulated gastric pH 1.5 (blue), and simulated small intestine pH value 8 (red) at 37° C. (FIG. 13A) and C7 release from alginate coated-ZIF-8 in PBS, under simulated gastric pH 1.5 (blue), and simulated small intestine pH value 8 (red) at 37° C. (FIG. 13B).

FIG. 14 illustrates C7-ZIF-8@Alginate dose response curve at 0, 30, 90, 120, and 180 mins. Data are shown as Mean±SEM, (N=4), *$p<0.001$,$p<0.01$, *$p<0.05$ vs. basal blood glucose level of respective group.

DEFINITIONS

Figure 1:
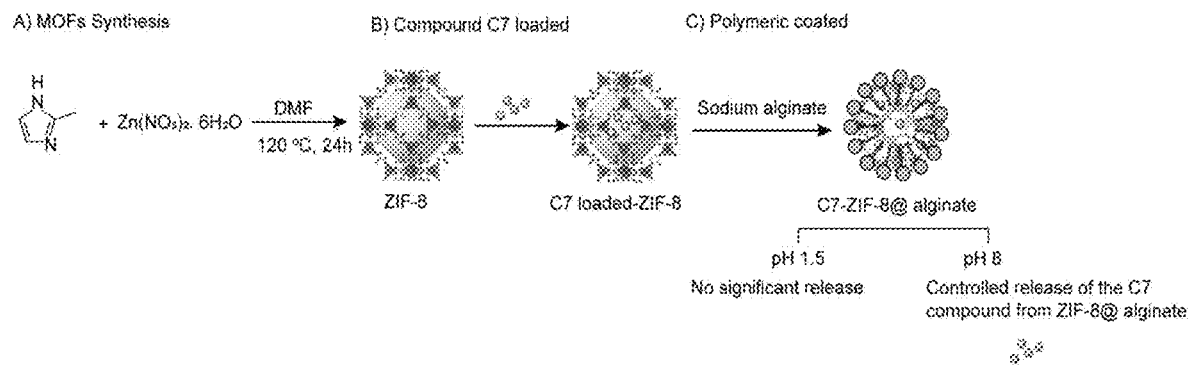
FIG. 1 provides a schematic illustration of the synthetic procedure of C7-ZIF-8@Alginate and use as carrier for release of antidiabetic drug C7 in a basic environment.

As used in this description and the accompanying claims, the following terms shall have the meanings indicated, unless the context otherwise requires:

As used herein, the singular forms "a, an" and "the" include plural references unless the content clearly dictates otherwise.

To the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

As used herein, "treatment" is understood to refer to the administration of a drug or drugs to a patient suffering from diabetes.

As used herein, the term "therapeutically effective amount" indicates the amount of the compound which is effective to treat any symptom or aspect of the diabetes. Effective amounts can be determined routinely. Further guidance on dosages and administration regimens is provided below. Furthermore, the term "therapeutically effective amount" means any amount which, as compared to a corresponding subject who has not received such amount, results in improved treatment, healing, prevention, or amelioration of a disease, disorder, or side effect, or a decrease in the rate of advancement of a disease or disorder. The term also includes within its scope amounts effective to enhance normal physiological function.

The term "treatment" is used conventionally, e.g., the management or care of a subject for the purpose of combating, alleviating, reducing, relieving, improving, etc., one or more of the symptoms associated with a diabetes. Administering effective amounts of the compound can treat one or more aspects of the diabetes disease, enhancing patient's quality of life; reducing adverse symptoms associated with diabetes; and reducing the frequency, severity, intensity, and/or duration of any of the aforementioned aspects.

The term "subject" in accordance with the present invention, includes, e.g., mammals, such as dogs, cats, horses, rats, mice, monkeys, and humans.

Unless defined otherwise, all technical and scientific terms used herein have the same meaning as commonly understood by one of ordinary skill in the art to which the disclosure belongs. Although any methods and materials similar to or equivalent to those described herein may be used in the practice or testing of the present disclosure, the preferred materials and methods are described below.

DETAILED DESCRIPTION

The present invention pertains to a pH-controlled drug delivery system (DDS) synthesized through a solvent-free mechanochemical process, for release in a basic environment. In embodiments, the system, named C7-ZIF-8@Alginate, combines cycloheptylamine hydrochloride (C7), an oral antihyperglycemic agent for treating type II diabetes, within an alginate-coated Metal-Organic Framework (MOF) structure, ZIF-8. In certain embodiments, the purpose of the present invention is to enhance drug solubility, stability, and controlled release of C7 in the basic environment of the intestines by utilizing the unique properties of MOFs, such as their coordinately unsaturated centers and large surface area. In preferred embodiments, the DDS's structure and properties were determined through comprehensive characterization methods, including, but not limited to, XRD, TGA, FT-IR, SEM, or BET analysis. In certain embodiments, the resulting C7-ZIF-8@Alginate formulation demonstrates promising antidiabetic activities in both in vitro and in vivo studies, signifying its potential in revolutionizing diabetes treatment and expanding the healthcare In one aspect, the subject invention discloses a system for targeted delivery comprising a pH-sensitive alginate coating for controlled release of an active compound in the basic pH of the intestines. The coating includes, but is not limited to, a Metal-Organic Framework (MOF) encapsulating the active compound for the treatment of type 2 diabetes. In preferred embodiments, the active compound is cycloheptylamine or a pharmaceutically acceptable salt thereof, and optionally one or more pharmaceutical excipients. In more preferred embodiments, the active compound is cycloheptylamine hydrochloride (C7).

In another aspect, the subject invention discloses a pharmaceutical composition for treating type 2 diabetes comprising an active compound encapsulated within a pH-sensitive sodium alginate coating for controlled release in the basic environment of the intestines. In embodiments, the coating comprises a Metal-Organic Framework (MOF), wherein the MOF comprises a zeolitic imidazolate framework 8 (ZIF-8). In preferred embodiments the active compound is released at basic pH ranging from about 5.7 to about 7.4.

In a further aspect, the subject invention discloses a method of treating type 2 diabetes comprising administering an effective amount of the pharmaceutical composition to a subject in need thereof.

In certain embodiments, the active compound is cycloheptylamine hydrochloride (C7) coated within a zeolitic imidazolate framework 8 (ZIF-8) with pH-sensitive sodium alginate (C7-ZIF-8@Alginate).

In preferred embodiments, C7-ZIF-8@Alginate is stable in the acidic stomach environment and is released in the intestines where pH ranges from about 5.7 to about 7.4.

In preferred embodiments, the subject is a mammal and the mammal is a human.

Applications of MOFs in Pharmacology.

In embodiments, Metal-Organic Frameworks (MOFs) in drug delivery systems (DDSs) have unique properties, comprising high surface area, customizable porosity, and drug encapsulation capabilities. In preferred embodiments, MOFs offer precise drug release control and improved drug utilization, addressing conventional delivery challenges.

Additionally, in preferred embodiments, previously patented drug Cycloheptylamine, an oral antidiabetic drug under U.S. Pat. No. 11,091,426B1 can be utilized with the system of the present invention. In certain embodiments, Cycloheptylamine's efficacy and bioavailability is enhanced by encapsulating it within Metal-Organic Frameworks (MOFs). In certain embodiments, the system of the present invention utilizes MOFs, specifically encapsulating Cycloheptylamine hydrochloride (C7) within ZIF-8 coated with pH-sensitive sodium alginate (C7-ZIF-8@Alginate), targeting controlled drug release in basic environments. This enhances drug stability and directs delivery to the intestines, improving therapeutic outcomes in diabetes management. In certain embodiments, the structure and attributes of C7-ZIF-8@Alginate are validated through XRD, TGA, SEM, and FT-IR analysis. Our aim is to significantly bolster Cycloheptylamine's effectiveness, offering advancements in patient care and potentially replacing current combinational therapies.

In certain embodiments, the design of the present invention focuses on directing drug release to the intestines, addressing a critical need in diabetes management. This targeted delivery system aims to optimize drug absorption, potentially improving therapeutic outcomes.

In certain embodiments, the use of pH-sensitive sodium alginate coating on ZIF-8 encapsulated Cycloheptylamine (C7-ZIF-8@Alginate) demonstrates innovation in achieving controlled drug release in basic environments, which enhances drug stability and reduces side effects.

In certain embodiments, comprehensive analyses like XRD, TGA, SEM, and FT-IR is employed to validates the structure and properties of the developed formulation, showcasing a thorough and rigorous approach to confirm its efficacy and attributes.

Compositions featuring the above-mentioned compounds may be specially formulated for administration in solid or liquid form, including those adapted for the following: (1) oral administration, for example, tablets, granules, for oral application.

Wetting agents, emulsifiers and lubricants, such as sodium lauryl sulfate and magnesium stearate, as well as coloring agents, release agents, coating agents, sweetening, flavoring and perfuming agents, preservatives and antioxidants can also be present in the compositions.

Examples of pharmaceutically-acceptable antioxidants include: (1) water soluble antioxidants, such as ascorbic acid, cysteine hydrochloride, sodium bisulfate, sodium metabisulfite, sodium sulfite and the like; (2) oil-soluble antioxidants, such as ascorbyl palmitate, butylated hydroxyanisole (BHA), butylated hydroxytoluene (BHT), lecithin. propyl gallate, alpha-tocopherol, and the like; and (3) metal chelating agents, such as citric acid, ethylenediamine tetraacetic acid (EDTA), sorbitol, tartaric acid, phosphoric acid, and the like.

The formulations may conveniently be presented in unit dosage form and may be prepared by any methods well known in the art of pharmacy. The amount of compound which can be combined with a carrier material to produce a single dosage form will vary depending upon the subject being treated, the particular mode of administration. The amount of an active ingredient which can be combined with a carrier material to produce a single dosage form will usually be that amount of the compound which produces a therapeutic effect.

In certain embodiments, a formulation of the compounds includes an excipient selected from the group consisting of cyclodextrins, liposomes, micelle forming agents, e.g., bile acids, and polymeric carriers, e.g., polyesters and polyanhydrides; and an active ingredient that may be the compound and/or one of its pharmaceutically acceptable derivatives. In certain embodiments, an aforementioned formulation renders orally bioavailable a compound or its derivative.

Methods of preparing these formulations or compositions include the step of bringing into association the compound with the carrier and, optionally, one or more accessory ingredients. As described below.

Liquid dosage forms for oral administration of the compounds include pharmaceutically acceptable emulsions, microemulsions, solutions, and suspensions. In addition to the active ingredient, the liquid dosage forms may contain inert diluents commonly used in the art, such as, for example, water or other solvents, solubilizing agents and emulsifiers, such as ethyl alcohol, isopropyl alcohol, ethyl carbonate, ethyl acetate, benzyl alcohol, benzyl benzoate, propylene glycol, 1,3-butylene glycol, oils (in particular, cottonseed, groundnut, corn, germ, olive, castor and sesame oils), glycerol, tetrahydrofuryl alcohol, polyethylene glycols and fatty acid esters of sorbitan, and mixtures thereof.

Besides inert diluents, the oral compositions can also include adjuvants such as wetting agents, emulsifying and suspending agents, sweetening, flavoring, coloring, perfuming and preservative agents. Suspensions, in addition to the active compounds, may contain suspending agents as, for example, ethoxylated isostearyl alcohols, polyoxyethylene sorbitol and sorbitan esters, microcrystalline cellulose, aluminum metahydroxide, bentonite, agar-agar and tragacanth, and mixtures thereof.

Formulations of the invention suitable for oral administration may be in the form of capsules, cachets, pills, tablets, lozenges (using a flavored basis, usually sucrose and acacia or tragacanth), powders, granules, or as a solution or a suspension in an aqueous or non-aqueous liquid, or as an oil-in-water or water-in-oil liquid emulsion, or as an elixir or syrup, or as pastilles (using an inert base, such as gelatin and glycerin, or sucrose and acacia) and/or as mouth washes and the like, each containing a predetermined amount of a compound of the present invention as an active ingredient. A formulation of the compound may also be administered as a bolus, electuary or paste.

A tablet may be made by compression or molding, optionally with one or more accessory ingredients. Compressed tablets may be prepared using binder (for example, gelatin or hydroxypropylmethyl cellulose), lubricant, inert diluent, preservative, disintegrant (for example, sodium starch glycolate or cross-linked sodium carboxymethyl cellulose), surface-active or dispersing agent. Molded tablets may be made by molding in a suitable machine a mixture of the powdered compound moistened with an inert liquid diluent.

The tablets, and other solid dosage forms of the formulation of the compound, such as dragees, capsules, pills prepared with coatings and shells, as enteric coatings formulated so as to provide slow or controlled release of the active ingredient therein using, nanoparticles in varying proportions to provide the desired release profile, other polymer matrices, liposomes and/or microspheres. They may be formulated for rapid release, e.g., freeze-dried. They may be sterilized by, for example, filtration through a bacteria-retaining filter, or by incorporating sterilizing agents in the form of sterile solid compositions which can be dissolved in sterile water, or some other sterile injectable medium immediately before use. These compositions may also optionally contain opacifying agents and may be of a composition that they release the active ingredient(s) only, or preferentially, in a certain portion of the gastrointestinal tract, optionally, in a delayed manner. Examples of embedding compositions which can be used include polymeric substances and waxes. The active ingredient can also be in micro-encapsulated form, if appropriate, with one or more of the above-described excipients.

Pharmaceutical compositions of the present invention are suitable for oral administration.

These compositions may also contain adjuvants such as preservatives, wetting agents, emulsifying agents and dispersing agents. Prevention of the action of microorganisms upon the subject compounds may be ensured by the inclusion of various antibacterial and antifungal agents, for example, paraben, chlorobutanol, phenol sorbic acid, and the like. It may also be desirable to include isotonic agents, such as sugars, sodium chloride, and the like into the compositions. In addition, prolonged absorption of the injectable pharmaceutical form may be brought about by the inclusion of agents which delay absorption such as aluminum monostearate and gelatin.

Regardless of the route of administration selected, the compound may be formulated into pharmaceutically-acceptable dosage forms by conventional methods known to those of skill in the art. The compound may be formulated for administration in any convenient way for use in human or veterinary medicine, by analogy with other pharmaceuticals.

In certain embodiments, cycloheptylamine includes the compound. Cycloheptylamine comprises pharmaceutical formulations of the present invention in the form of its pharmaceutically acceptable organic and inorganic salts, hydrates, solvates, esters, enantiomers, racemates or combinations thereof in terms of chemical structure; in free form, crystalline, amorphous forms or combinations thereof in terms of polymorphic structure.

The above compound compositions may be used in novel therapeutic methods of treatment in diabetes patients. The methods include administering to a subject an effective amount of a pharmaceutical compound composition. The above invention is suitable for use to treat type 2 diabetes.

Also provided are methods of treating diabetes, which include administering the compounds in conjunction with an agent to a subject. Conjunctive therapy includes sequential, simultaneous and separate, or co-administration of the compound and the agent in a way that the therapeutic effect of the agent is not entirely disappeared when the compound is administered. In certain embodiments, compound and the agent may be compounded together in the same unitary pharmaceutical composition including both entities. Alternatively, the combination of compound and the agent may be administered separately in separate pharmaceutical compositions, each including one of the compound and the agent in a sequential manner wherein, for example, the compound or the agent is administered first and the other second.

Exemplary doses of the compounds in the range from about 0.001, 0.01, 0.1, 0.5, 1, 10, 15, 20, 25, 50, 100, 200, 300, 400, 500, 600, or 750 to about 1000 mg per day.

The combined use of the compound and other agents may reduce the required dosage for any individual component because the onset and duration of effect of the different components may be complementary. In such combination therapies, the different active agents may be delivered together or separately, and simultaneously or at different times within the day.

As is evident from the foregoing description, certain aspects of the present disclosure are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present disclosure.

Moreover, unless defined otherwise, all technical and scientific terms used herein have the same meaning as commonly understood by one of ordinary skill in the art to which the disclosure belongs. Although any methods and materials similar to or equivalent to or those described herein can be used in the practice or testing of the present disclosure, the preferred methods and materials are described above.

The disclosure will be more fully understood upon consideration of the following non-limiting Examples. It should be understood that these Examples, while indicating preferred embodiments of the subject technology, are given by way of illustration only. From the above discussion and these Examples, one skilled in the art can ascertain the essential characteristics of the subject technology, and without departing from the spirit and scope thereof, can make various changes and modifications of the subject technology to adapt it to various uses and conditions.

SELECTED EMBODIMENTS

Embodiment 1. A system for targeted drug delivery, the system comprising a pH-sensitive alginate coating for controlled release of an active compound in the intestines, wherein the coating comprises a Metal-Organic Framework (MOF) encapsulating the active compound for the treatment of type 2 diabetes.

Embodiment 2. The system of embodiment 1, wherein the active compound comprises an oral antidiabetic drug or a pharmaceutically acceptable salt thereof and optionally one or more excipients.

Embodiment 3. The system of embodiment 2, wherein the oral antidiabetic drug comprises Cycloheptylamine or a pharmaceutically acceptable salt of Cycloheptylamine.

Embodiment 4. The system of embodiment 2, wherein the pharmaceutically acceptable salt is Cycloheptylamine hydrochloride (C7).

Embodiment 5. The system of embodiment 1, wherein the pH-sensitive coating releases C7 at basic pH.

Embodiment 6. The system of embodiment 5, wherein the basic pH ranges from about 5.7 to about 7.4.

Embodiment 7. The system of embodiment 1, wherein the coating comprises a zeolitic imidazolate framework 8 (ZIF-8).

Embodiment 8. The system of embodiment 7, wherein Cycloheptylamine hydrochloride (C7) within ZIF-8 coated with pH-sensitive sodium alginate (C7-ZIF-8@Alginate) remains stable in the acidic stomach environment.

Embodiment 9. The system of embodiment 1, wherein the analysis to validate DDS' structure and properties is selected from the group consisting of XRD, TGA, FT-IR, SEM, BET, and combinations thereof.

Embodiment 10. The system of embodiment 2, wherein the oral antidiabetic drug comprises alpha-glucosidase inhibitors, amylin analogs, dipeptidyl peptidase 4 inhibitors, incretin mimetics, insulin, biguanides, meglitinides, non-sulfonylureas, SGLT-2 inhibitors, sulfonylureas, thiazolidinediones, bromocriptine, or combinations thereof.

Embodiment 11. A pharmaceutical composition for treating type 2 diabetes, the composition comprising an active compound encapsulated within a pH-sensitive sodium alginate coating for controlled release at a basic pH, wherein the coating comprises a Metal-Organic Framework (MOF), wherein the MOF comprises a zeolitic imidazolate framework 8 (ZIF-8), wherein the basic pH ranges from about 5.7 to about 7.4.

Embodiment 12. A method of treating type 2 diabetes, comprising administering an effective amount of the composition of claim 11 to a subject in need thereof.

Embodiment 13. The method of embodiment 12, wherein the active compound comprises an oral antidiabetic drug or a pharmaceutically acceptable salt thereof and optionally one or more excipients.

Embodiment 14. The method of embodiment 13, wherein the oral antidiabetic drug comprises Cycloheptylamine or a pharmaceutically acceptable salt of Cycloheptylamine.

Embodiment 15. The method of embodiment 13, wherein the pharmaceutically acceptable salt is Cycloheptylamine hydrochloride (C7).

Embodiment 16. The method of embodiment 15, wherein C7 within ZIF-8 coated with pH-sensitive sodium alginate (C7-ZIF-8@Alginate) remains stable in the acidic stomach environment.

Embodiment 17. The method of embodiment 12, wherein the subject is a mammal.

Embodiment 18. The method of embodiment 17, wherein the mammal is a human.

Embodiment 19. The method of embodiment 13, wherein the oral antidiabetic drug comprises alpha-glucosidase inhibitors, amylin analogs, dipeptidyl peptidase 4 inhibitors, incretin mimetics, insulin, biguanides, meglitinides, non-sulfonylureas, SGLT-2 inhibitors, sulfonylureas, thiazolidinediones, bromocriptine, or combinations thereof.

Embodiment 20. The method of embodiment 16, wherein C7-ZIF-8@Alginate is released in the basic environment of the intestines.

Example 1—Synthesis

Synthesis of Cycloheptylamine Hydrochloride (C7).

As previously described [7], Briefly, cycloheptylamine was dissolved in minimal amount of methanol and treated with excess hydrochloric to form the salts. The salt was collected from diethyl ether using vacuum filtration to give compounds (C7). This compound was off white solid, yield 94%, mp 217-218° C.; 1HNMR (DMSO-d6) ($\delta$, ppm): 1.36-1.60 (m, 10H, cycloheptyl ring), 1.82 (m, 2H, cycloheptyl ring), 3.98 (m, 1H, cycloheptyl ring), 8.24 (brs, 3H, NH3, cycloheptylamine, D2O-exchange); 13C-NMR (DMSO-d6) ($\delta$, ppm): 23.2, 27.2, 32.3, 52.7; Anal. Calcd for C7H16ClN: C, 56.18; H, 10.78; N, 9.36; Found: C, 56.63; H, 10.85; N, 9.64.

Synthesis of ZIF-8, Coated ZIF-8 and ZIF-8 Loaded Drug.

A mixture of zinc acetate.4H2O (0.15 g) and 2-methylimidazole (0.33 g) were ball milled under a solvent-free condition at room temperature for 45 minutes. The resulting milky dough was washed with dimethylformamide in order to remove remaining metal ions and ligands. The powder was washed then with methanol, and the MOF particles were retrieved by centrifugation. After drying in a vacuum oven, crystalline structure and morphology of the nanoparticles were investigated using Fourier transform infrared spectroscopy (FT-IR), X-ray powder diffraction (XRPD) and scanning electron microscopic (SEM).

Synthesis of alginate-coated ZIF-8 nanoparticles (ZIF-8@alginate). The MOF coating process was done through the in situ ball milling reaction. A mixture of zinc acetate.4H2O (0.15 g), 2-methylimidazole (0.33 g) and sodium alginate (0.15 g) were ball-milled at room temperature for 1 hour at 28 Hz. Washing and drying process was applied on the obtained product according to the above-described method. The presence of alginate in the obtained nanoparticles was evaluated by FT-IR spectroscopy. The thermal stability and thermogravimetric behavior of the coated MOF were investigated by the TGA. To investigate the effect of coating on morphology, crystalline structure and porosity properties of the nanoparticles, SEM, PXRD and BET analyses were done. Loading cycloheptylamine hydrochloride on ZIF-8. Exactly 0.1 g of cycloheptylamine hydrochloride was dissolved in 5 ml of deionized water, which continued by the addition of ZIF-8 (0.05 g). This solution was stirred at room temperature for 3 days. The final product was washed three times with methanol to remove unloaded drugs and then it was dried at 60° C.

Example 2—Stability

Stability Test.

Precisely 1000 mL of aqueous solutions at pH 2, 3, 6, 10, and 12 was prepared separately. ZIF-8 (90 mg) was separately dispersed in the above aqueous solution. The mixture was then gently shaken and allowed to stand for 24 h. The sample was then centrifuged and dried for subsequent XRDvcharacterization. Drug Release From ZIF-8. ZIF-8 (50 mg) were charged in 10 mL of a 400 mg/L C7 aqueous solution. The solution was stirring at 25° C. for 24 h and then the solution centrifuged for about 10 min. The drug concentration was estimated using UV-Vis spectroscopy analysis and the quinazoline load was calculated using the below equation:

$$C7 \text{ wt. }\% = C7 \text{ (mg) ZIF-8 (mg) }\%$$

Here, the drug loading (wt %) is equal to the ratio of the weight of C7 present in the ZIF-8 to the total weight of the synthesized ZIF-8. According to the suggested formula ZIF-8—C7, the drug loading (wt %) has been calculated as 87% respectively. The in vitro release of the C7 from the ZIF-8 was performed in phosphate buffer (pH 8 and pH 1.5). In this procedure, 0.02 g of loaded ZIF-8 was added to 50 ml of each buffer separately. Then, the solution was stirred at 37° C. for 3 days. Each time, 5 ml of the solution was removed and quickly replaced with the same amount of fresh buffer. The amount of drug released from ZIF-8 was investigated using UV-Vis spectrometer at 209 nm. The C7 concentration in each sample was calculated using the calibration curve that was determined earlier. The corrected concentration of released C7 was calculated using the following equation (5):=+Σ−10 where Ctcorr is the adjusted concentration at time t, Ct is the calculated concentration of C7 at time t, v is the volume of the derived samples, and V is the total volume of release solution.

Figure 11:
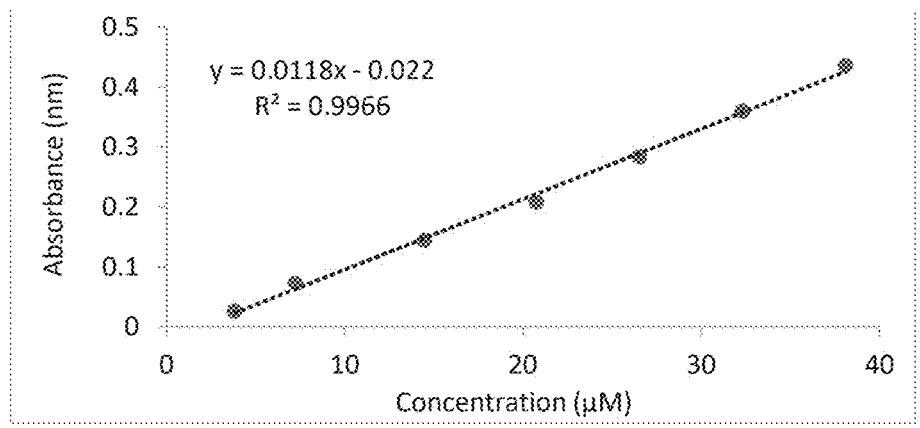
FIG. 11 shows standard calibration curve of C7 in phosphate buffer solution (pH 8).
Figure 12:
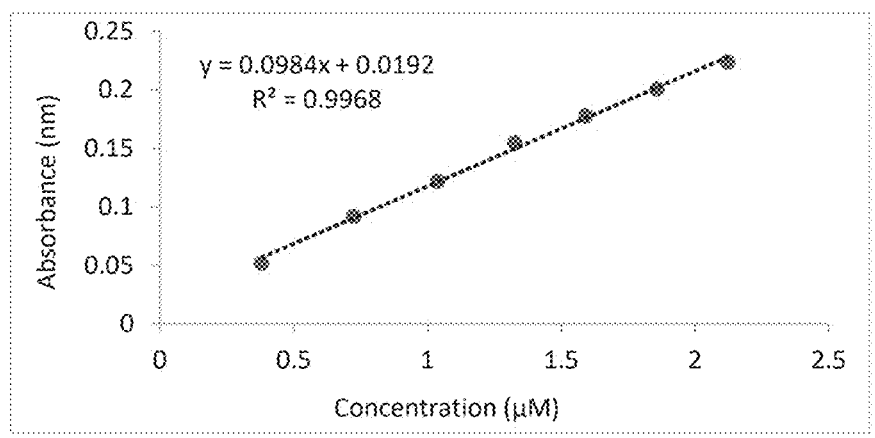
FIG. 12 shows standard calibration curve of C7 in phosphate buffer solution (pH 1.5).
Figure 15:
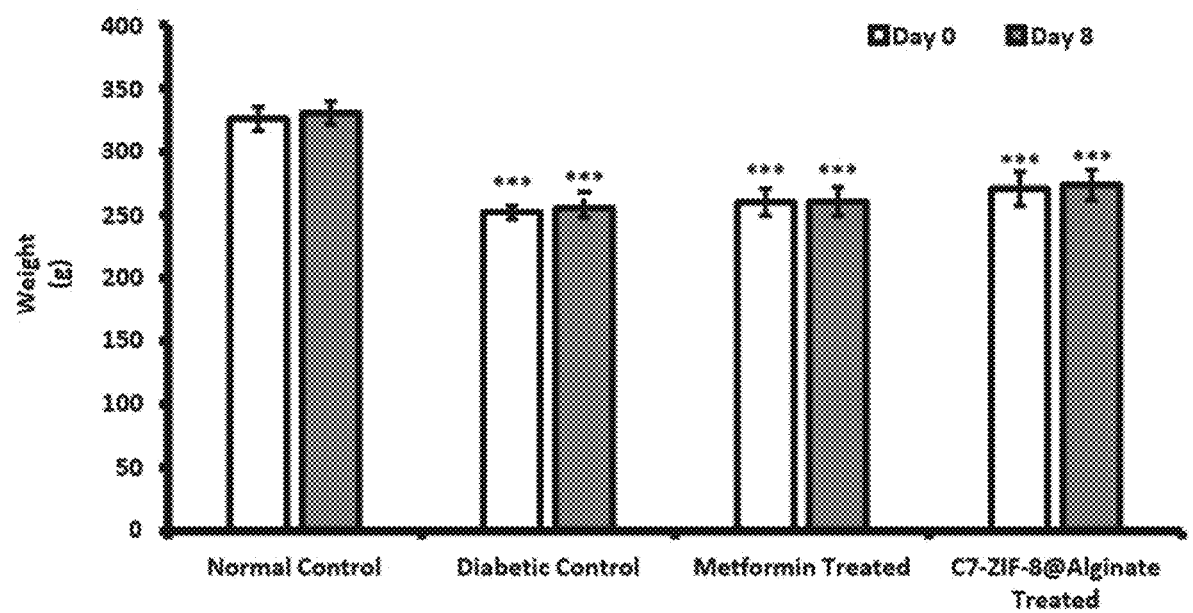
FIG. 15 illustrates the effect of C7-ZIF-8@Alginate administration on body weight before and after treatment. Data are shown as Mean±SEM, (N=8), ***$p<0.001$ vs. Normal Control group.
Figure 16:
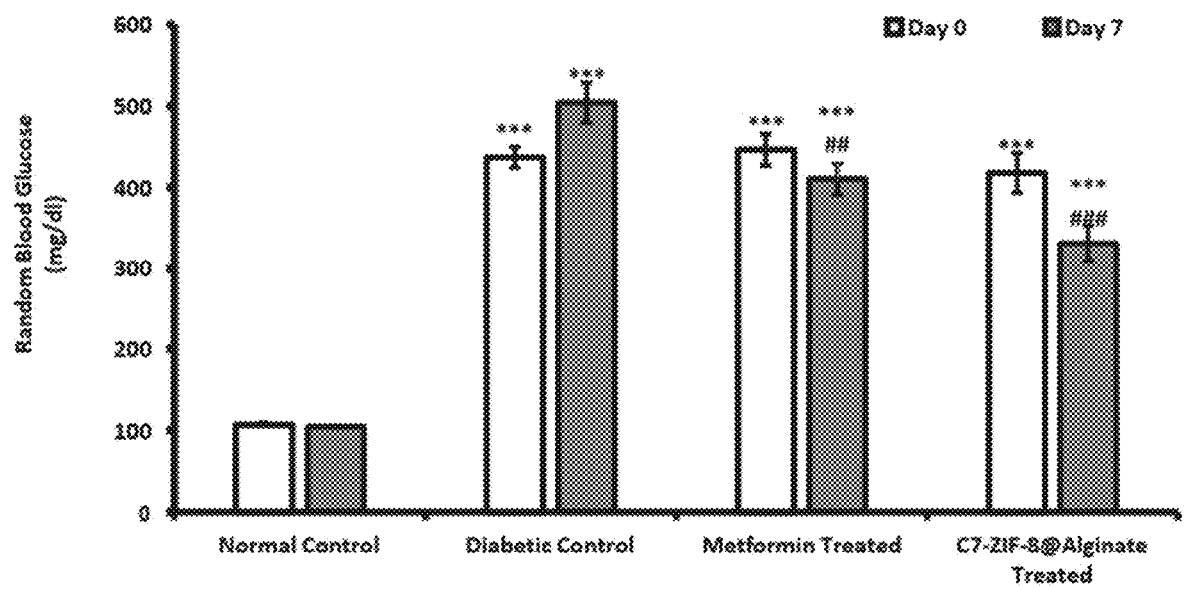
FIG. 16 illustrates the effect of C7-ZIF-8@Alginate administration on random blood glucose before and after treatment. Data are shown as Mean±SEM, (N=8), ***$p<0.001$ vs. Normal Control group; ###$p<0.001$, ##$p<0.01$ vs. Diabetic Control group.
Figure 17:
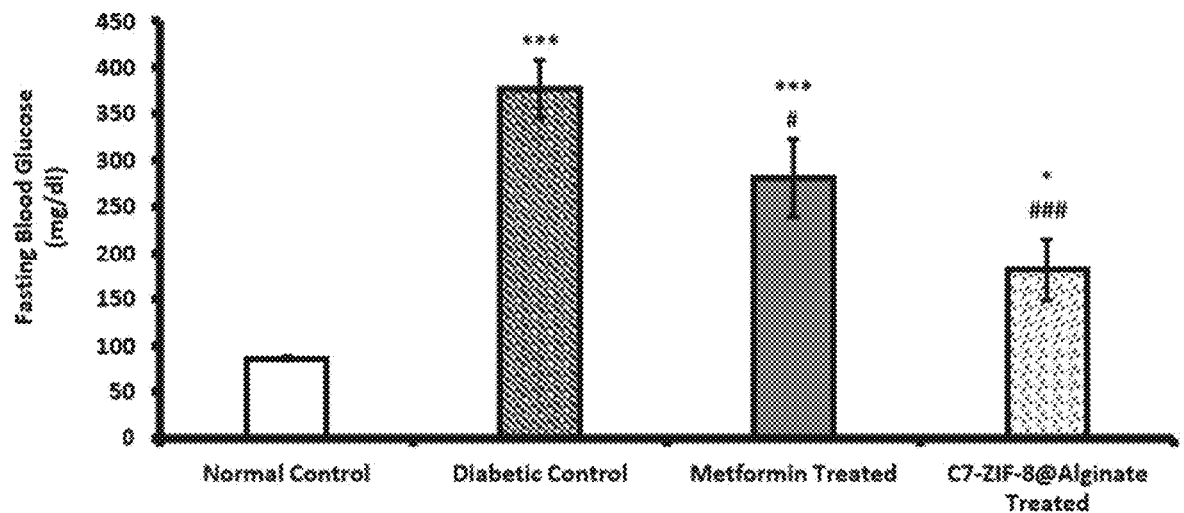
FIG. 17 illustrates the effect of C7-ZIF-8@Alginate administration on fasting blood glucose. Data are shown as Mean±SEM, (N=8), ***$p<0.001$, *$p<0.05$ vs. Normal Control group; ###$p<0.001$, #$p<0.05$ vs. Diabetic Control group.
Figure 18:
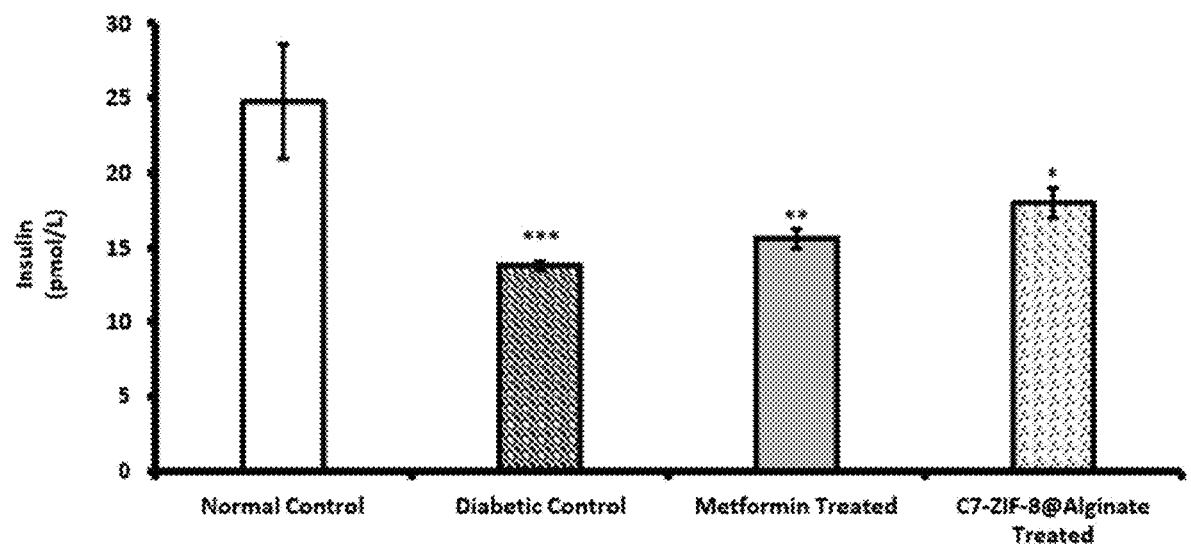
FIG. 18 illustrates the effect of C7-ZIF-8@Alginate administration on serum insulin. Data are shown as Mean±SEM, (N=8) *$p<0.001$, $p<0.01$, *$p<0.05$ vs. Normal Control group.
Figure 19:
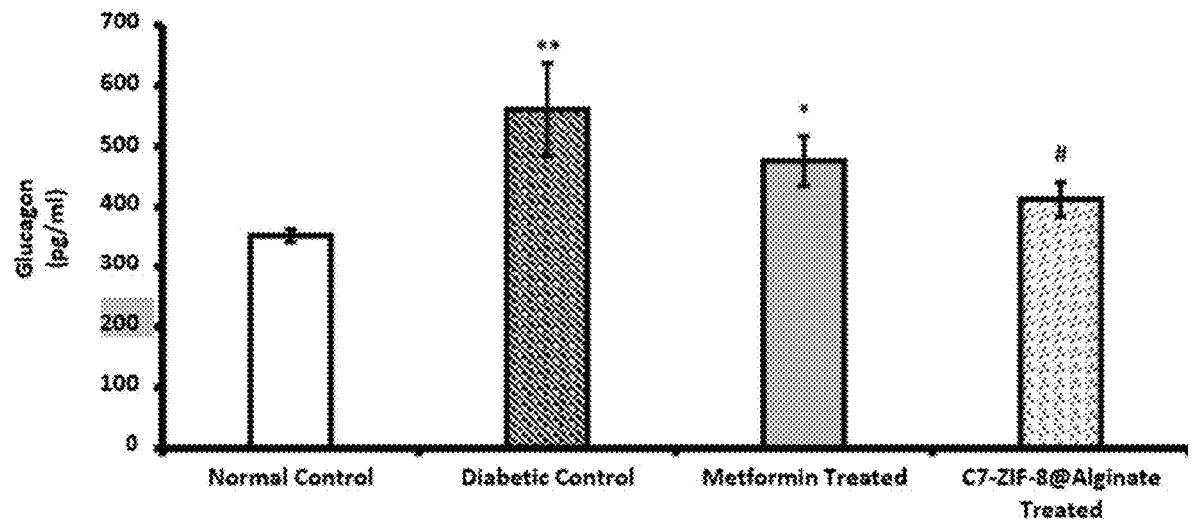
FIG. 19 illustrates the effect of C7-ZIF-8@Alginate administration on serum glucagon. Data are shown as Mean±SEM, (N=8) **$p<0.01$, *$p<0.05$ vs. Normal Control group; #$p<0.05$ vs. Diabetic Control group.
Figure 20:
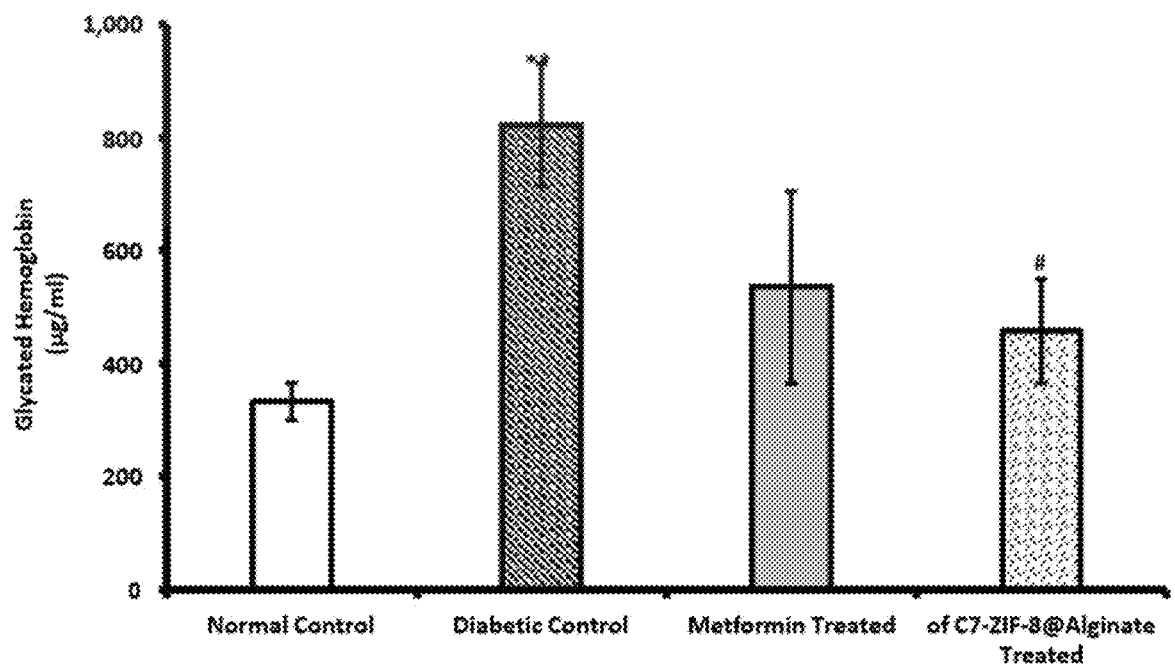
FIG. 20 illustrates the effect of C7-ZIF-8@Alginate administration on glycated hemoglobin. Data are shown as Mean±SEM, (N=8) **$p<0.01$, vs. Normal Control group; #$p<0.05$ vs. Diabetic Control group.
Figure 21:
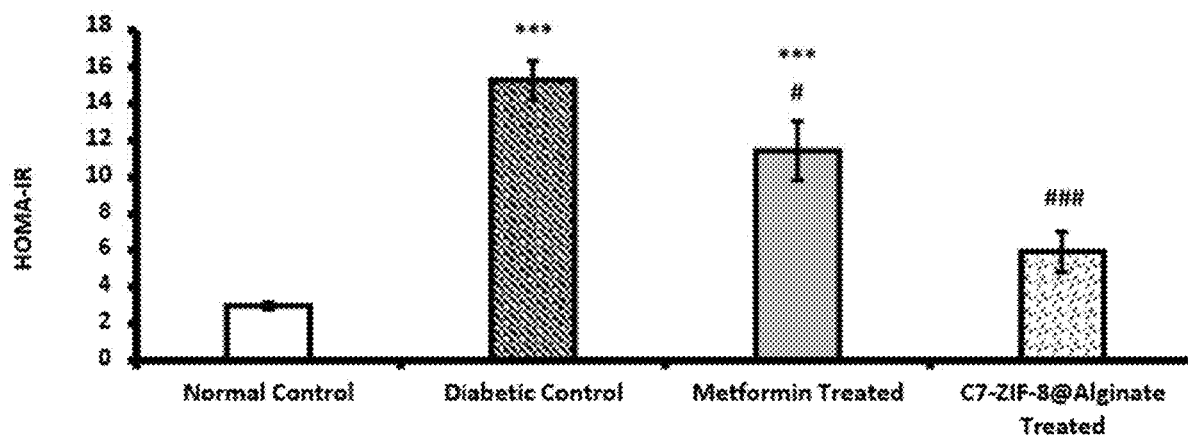
FIG. 21 illustrates the effect of C7-ZIF-8@Alginate administration on HOMA-IR. Data are shown as Mean±SEM, (N=8), ***$p<0.001$ vs. Normal Control group; ###$p<0.001$, #$p<0.05$ vs. Diabetic Control group.
Figure 22:
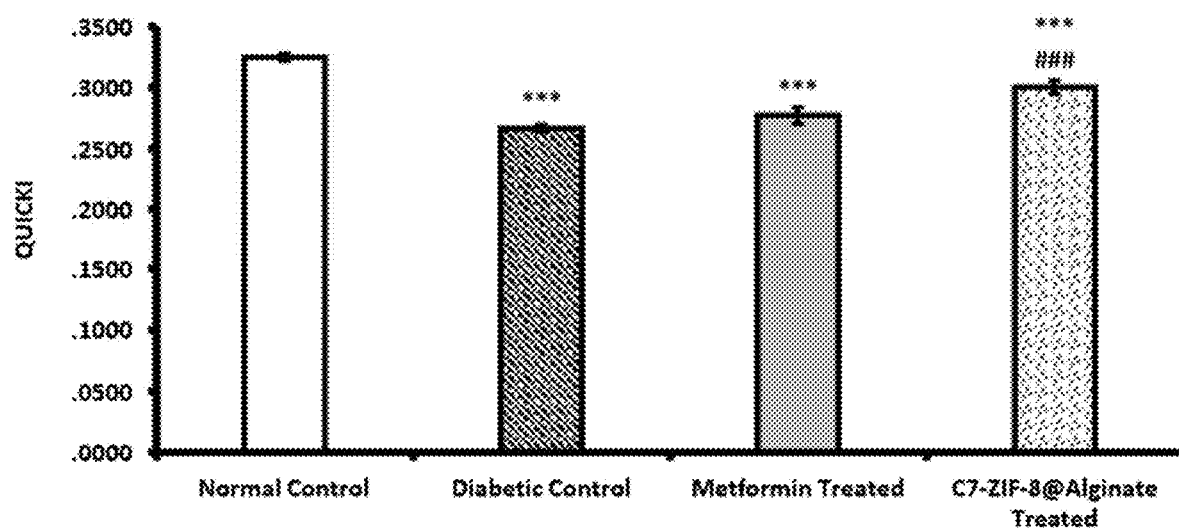
FIG. 22 illustrates the effect of C7-ZIF-8@Alginate administration on QUICKI. Data are shown as Mean±SEM, (N=8), ***$p<0.001$ vs. Normal Control group; ###$p<0.001$ vs. Diabetic Control group.

Preparation of standard solutions of cycloheptylamine hydrochloride (C7). Two C7 stock solutions were prepared by accurately weighing 100 mg into a 100 mL volumetric flask. Phosphate buffers with pH values of 8 and 1.5 were then added to dissolve C7 to the calibration line. A series of standard solutions of C7 in phosphate buffers with pH=8 (FIG. 11) and pH=1.5 (FIG. 12) as solvent were prepared. The standard curve of absorbance (A) and concentration (c) at this wavelength is established. The absorbance of the drug in phosphate buffer solutions pH 1.5 and 8 was measured at a wavelength of 209 nm.

C7-ZIF 8@Alginate Formulation

Figure 2A:
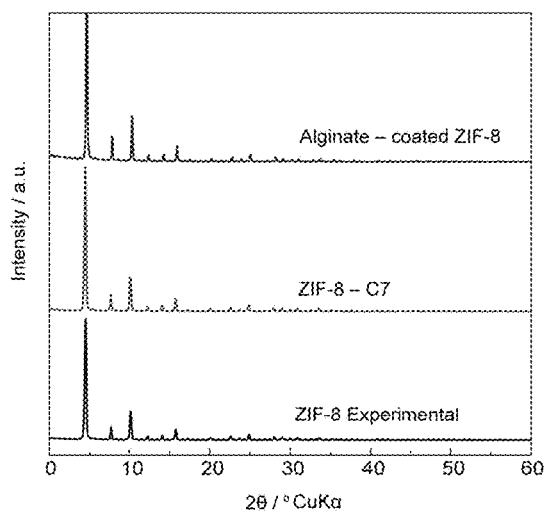
FIG. 2A-B illustrates the overlaying of ZIF-8, C7@ZIF-8 and ZIF-8@Alginate PXRD patterns (FIG. 2A) and UV-Visible spectra of C7, ZIF-8 and C7@ZIF-8 (FIG. 2B).
Figure 2B:
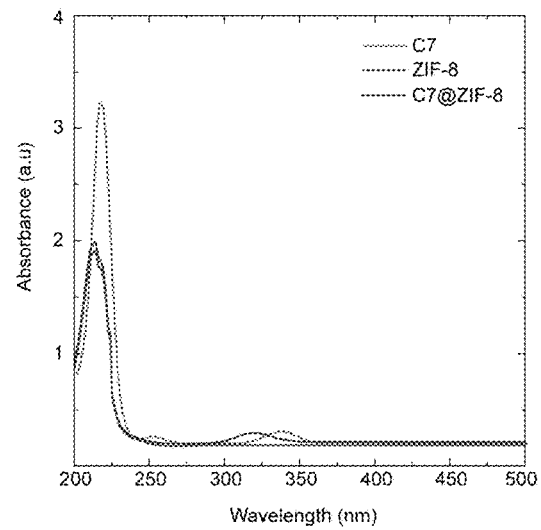

The XRD analysis, illustrated in FIG. 2A, clearly confirmed the formation of highly crystalline ZIF-8. The distinct peaks observed in the diffraction pattern of ZIF-8 at 2θ=7.11°, 12.5°, 17.75°, and 26.4° aligned precisely with previously reported literature and simulated crystallographic data [8]. Notably, the coating process exhibited no discernible effect on the crystalline structure of ZIF-8, preserving its inherent integrity. The powder XRD pattern comparison between plain ZIF-8 and C7@ZIF-8 revealed no significant alterations, reaffirming the unchanged crystallinity of ZIF-8 post-drug encapsulation. Validation of C7 loading into ZIF-8 was conclusively established using UV-Visible spectrophotometry, as demonstrated in FIG. 2B. ZIF-8 manifested a distinctive peak at 215 nm, while the spectra of C7 exhibited a sharp peak at 220 nm and a broader one with an edge at 335 nm. The emergence of a peak at 325 nm corroborated the presence of drug molecules within C7@ZIF-8, coinciding with the 218 nm peak characteristic of ZIF-8. An intriguing observation was the reduction in the drug's absorption intensity upon interaction with ZIF-8 within C7@ZIF-8. This reduction signifies a notable decline in the drug concentration within the solution, suggesting the efficient confinement of C7 within the MOF structure.

Overlaying of ZIF-8, C7@ZIF-8 and ZIF-8@Alginate PXRD patterns; B) UV-Visible spectra of C7, ZIF-8 and C7@ZIF-8. The IR spectrum of ZIF-8 (FIG. 2B), featuring the 2-methyl-imidazole ligand, exhibits key bands: N—H stretching at 3135 cm1, C—H stretching for methyl groups at 2929 (imidazole aliphatic C—H) and 1307 cm-1. Bands attributed to C—N and C=N were observed at 1457, 1423, and 1146 cm-1, slightly shifted due to coordination with the metallic center.

Figure 3:
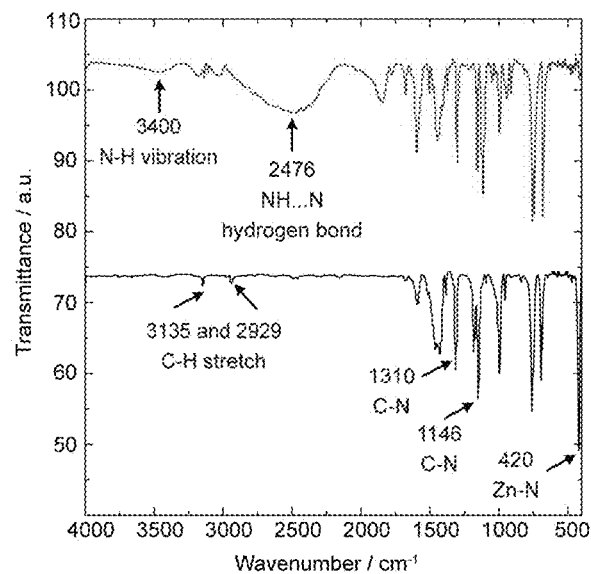
FIG. 3 illustrates FTIR spectra of 2-methylimidazole and ZIF-8.

A noticeable axial deformation was evident in the C=N band at 1576 cm-1. Additionally, the absorption band at 420 cm-1 is linked to Zn—N stretching. These band arrangements align with anticipated organic ligand behavior and are consistent with findings reported in literature [9]. FIG. 3. FTIR spectra of 2-methylimidazole and ZIF-8.

FT-IR analysis confirmed the formation of alginate-coated ZIF-8. The spectra depicted absorption bands characteristic of ZIF-8 alongside a broadband signal (3000-3600 cm-1) attributed to alginate's O—H vibrations. Stretching vibrations of aliphatic C—H bonds from both alginate and ZIF-8 were observed at 2852-2932 cm-1.

Figure 4A:
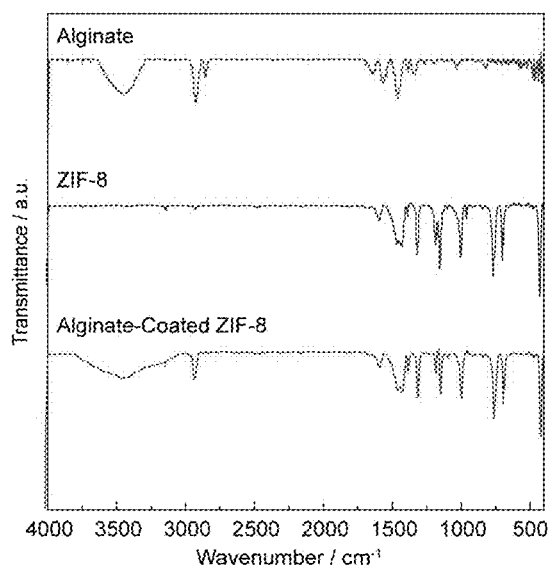
FIG. 4A-B illustrate FTIR spectra of alginate coated ZIF-8 compared with free alginate and ZIF-8 (FIG. 4A) and FTIR spectra illustrating C7, ZIF-8, and C7-loaded ZIF-8 for comparison (FIG. 4B).
Figure 4B:
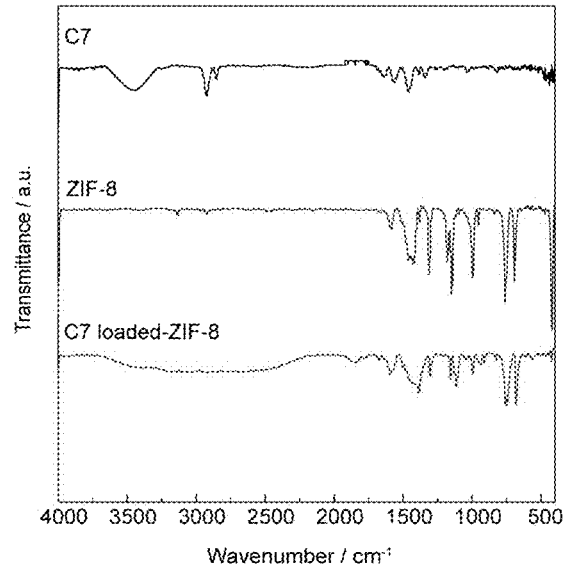

Bands between 1602 and 1683 cm1 corresponded to symmetric and asymmetric stretching vibrations of carboxylate groups, while C—O stretching modes appeared in the 1021 and 1102 cm-1 region. This suggests bonding between alginate and the MOF via hydrogen bonds and the interaction of positive zinc cations with alginate's negative carboxylate group (FIG. 4A). Comparing ZIF-8 spectra with C7@ZIF-8, notable similarities were observed (FIG. 4B). The FT-IR spectrum of C7-loaded nanoparticles presented a blend of C7 and ZIF-8 features. Peaks at 3370 cm-1 indicated asymmetric N—H bond vibrations, while the range of 3180-3300 cm-1 represented symmetric N—H vibrations of C7.

Figure 5A:
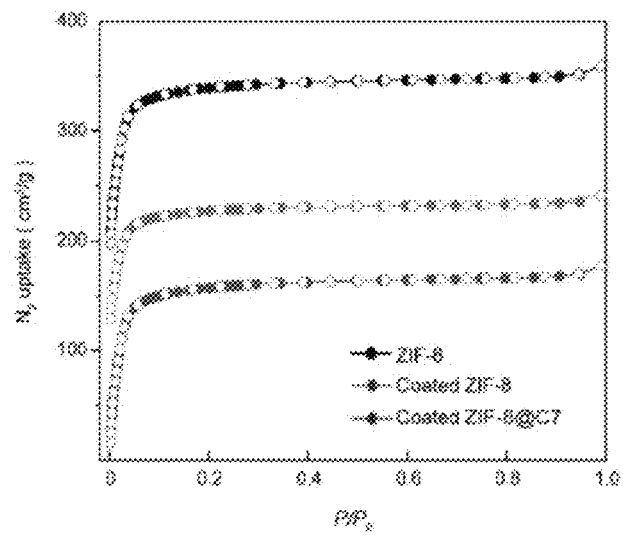
FIG. 5A-B illustrate ZIF-8 and the corresponding combination materials coated ZIF-8, and coated ZIF-8@C7 $N_2$ sorption isotherms at 77 K (FIG. 5A) and pore size distribution of ZIF-8, and ZIF-8@C7 (FIG. 5B).
Figure 5B:
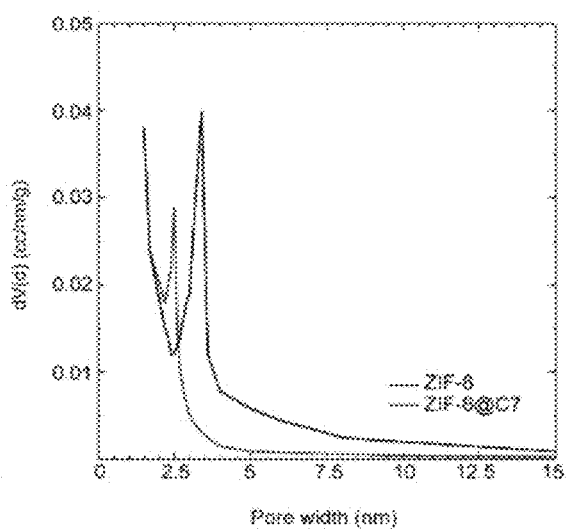

Peaks at 1622 and 1580 cm-1 were attributed to C=N and secondary N—H vibrations, respectively. These peaks within the FT-IR spectra of C7-loaded ZIF-8 affirmed the successful encapsulation of C7 within the framework. FTIR spectra of Alginate coated ZIF-8 in comparison with that of free alginate and ZIF-8; B) FTIR spectra illustrating C7, ZIF-8, and C7-loaded ZIF-8 for comparison. The N2 adsorption isotherms at 77 K for C7@ZIF-8 unveiled the presence of micropores, showcasing a type I isotherm that underscores ZIF-8's microporous nature (FIG. 5A). BET measurements indicated a decline in surface area from 1368 to 1026 m2 g-1 and a reduction in pore diameter from 11 to 9.3 nm due to the coating process. This reduction might stem from alginate's affinity for zinc ions and hydrogen bonding, allowing alginate chains to penetrate ZIF-8 pores. Upon C7 compound loading and nanoparticle coating with alginate, the specific surface area further decreased to 753 m2 g-1. Moreover, compared to ZIF-8's pore volume of 0.85 cm3 g-1, coated C7@ZIF-8 exhibited a significant decrease in pore volume to 0.23 cm3 g-1 after encapsulation. These observations suggest that the cage could effectively incorporate the C7 compound, likely by filling numerous pores with C7 molecules and coating the nanoparticle surface with alginate. The cage size of ZIF-8 (~11 Å) and the dimensions of the C7 compound (3.11×4.69 Å) support the successful loading of the C7 compound into ZIF-8 (FIG. 5B). ZIF-8 and the corresponding combination materials coated ZIF-8, and coated ZIF-8@C7 N2 sorption isotherms at 77 K (FIG. 5A) and pore size distribution of ZIF-8, and ZIF-8@C7 (FIG. 5B).

Figure 6:
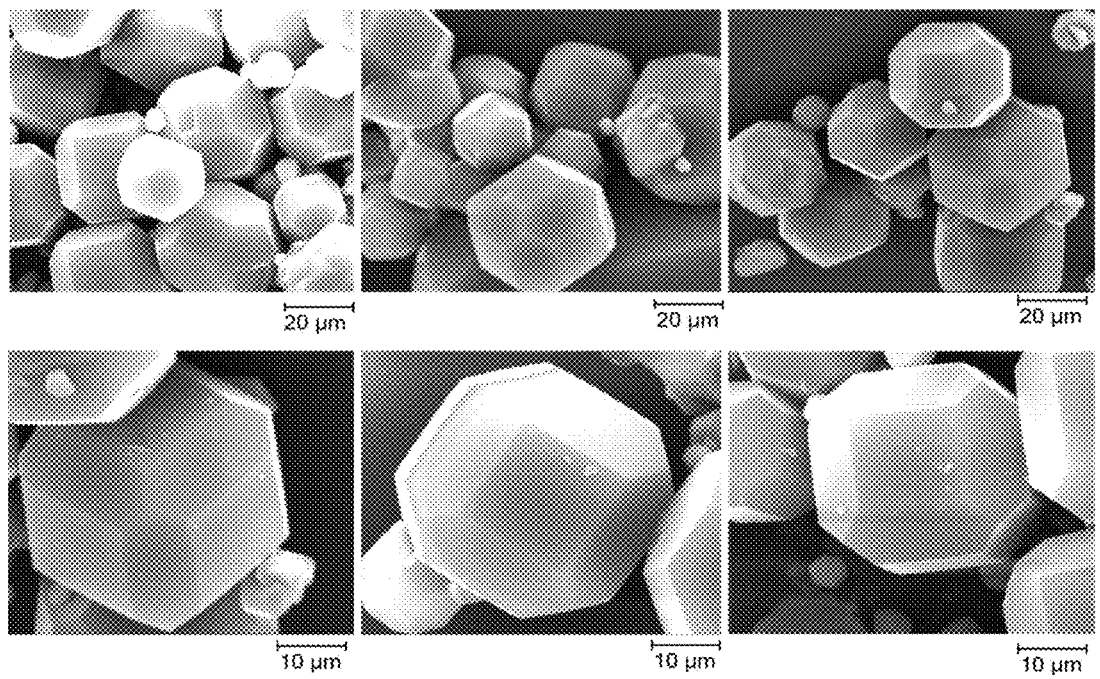
FIG. 6 illustrates SEM images of ZIF-8 showing truncated rhombic dodecahedron structure.

The SEM image of ZIF-8, as displayed in FIG. 6, exhibited particles showcasing a distinct truncated rhombic dodecahedron structure with a particle size of 80 nm, characteristic of ZIF-8 particles. Conversely, the SEM images of C7@ZIF-8 displayed an approximate particle size of 200 nm. In contrast to the clearly defined stereoscopic structure of ZIF-8, the morphology of C7@ZIF-8 showed a gradual deviation from regularity, with less defined angles and an increased particle size upon the introduction of C7 into ZIF-8, confirming successful loading. The SEM images indicated no significant alteration in the morphology of the coated nanoparticles compared to uncoated-ZIF-8.

FIG. 6 provides SEM images of ZIF-8 showing truncated rhombic dodecahedron structure. TGA was utilized to further assess the structure of the synthetic alginate coated-ZIF-8, as depicted in FIG. 7A. ZIF-8's thermal behavior aligned well with reported literature. The weight loss of the ZIF-8 framework initiated around 350° C., increasing notably and rapidly between 450° C. and 800° C., corresponding to the decomposition and carbonization of its organic components. Conversely, the alginate-coated ZIF-8 framework exhibited weight loss starting at approximately 250° C., with a sustained substantial weight loss (about 25 wt %) persisting up to 350° C. Similarly, TGA was employed to assess the synthetic alginate coated-ZIF-8 structure (FIG. 7B). ZIF-8's thermal characteristics also aligned with literature references.

The weight loss in the ZIF-8 framework initiated around 350° C., intensifying notably and rapidly between 450° C. and 800° C. due to the decomposition and carbonization of its organic constituents. In contrast, the degradation of alginate moieties in the alginate-coated ZIF-8 framework led to an onset of weight loss at around 250° C., with a sustained significant weight loss (approximately 25 wt %) continuing up to 350° C. (FIG. 7B).

Figure 7:
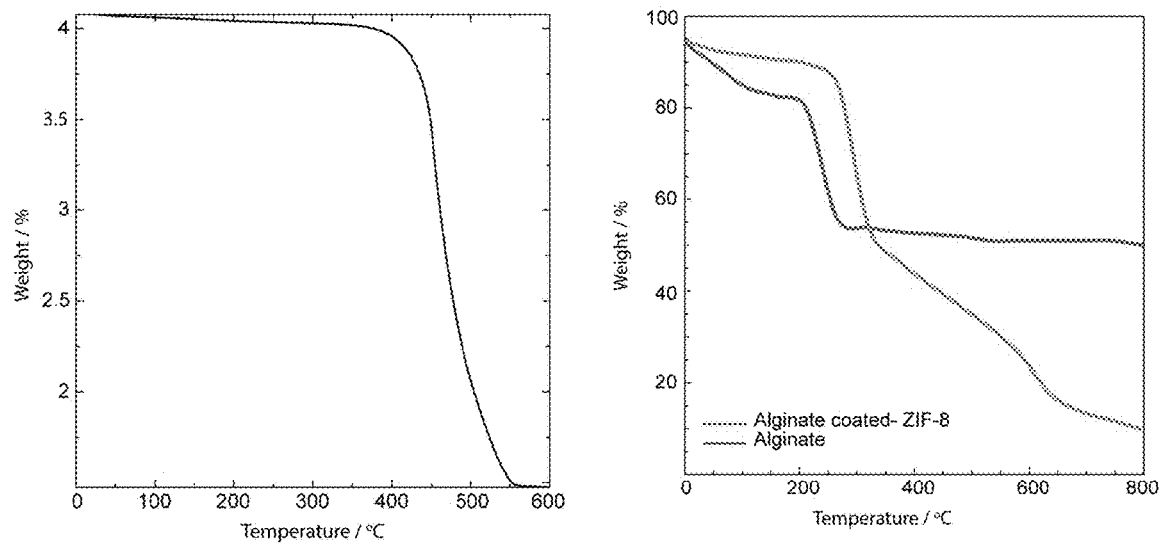
FIG. 7 illustrates TGA curves of ZIF-8 (left); alginate and alginate coated-ZIF-8 (right).

FIG. 7 shows TGA curves of ZIF-8 (left) and alginate and alginate coated-ZIF-8 (right)

We delved into the chemical stability of both ZIF-8 and C7@ZIF-8, extending beyond their thermal characteristics.

Figure 8:
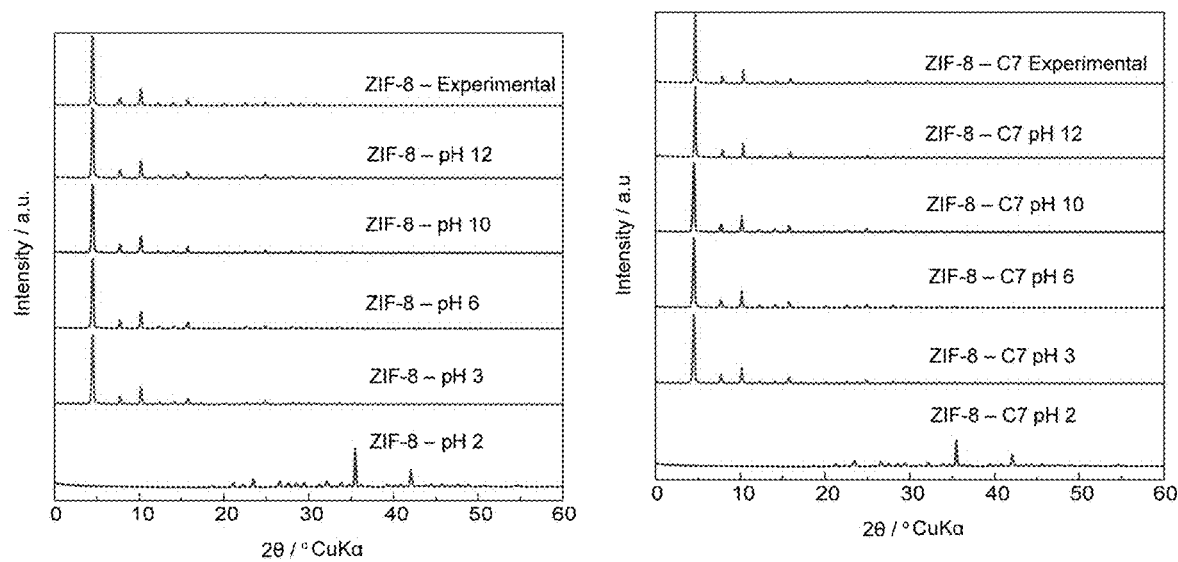
FIG. 8 illustrates PXRD patterns for ZIF-8 immersed in solutions of pH=2; pH=3; pH=6; pH=10, pH=12 for 24 h (left); XRD patterns for ZIF-8—C7: As-prepared; immersed in pH=2; pH=3; pH=6; pH=10, and pH=12 solutions for 24 h (right).

Assessing structural changes following exposure to aqueous media at varying pH levels involved retrieving ZIF-8 and C7@ZIF-8 from suspensions after 24 hours at specific pH conditions and examining PXRD and SEM results. FIG. 8 illustrates the pH stability investigation of ZIF-8 and C7@ZIF-8. PXRD analyses unveiled that after 24 hours, both maintained Their structural integrity across a pH range of 1 to 14. Notably, at pH 2, the structures of both ZIF-8 and C7@ZIF-8 collapsed entirely, undergoing significant MOF decomposition and resulting in the presence of an amorphous phase. XRD data highlighted the loss of crystallinity, revealing poor stability specifically in acidic environments. FIG. 8 shows PXRD patterns for ZIF-8 immersed in solutions of pH=2; pH=3; pH=6; pH=10, pH=12 for 24 h (left); XRD patterns for ZIF-8—C7.

Figure 9:
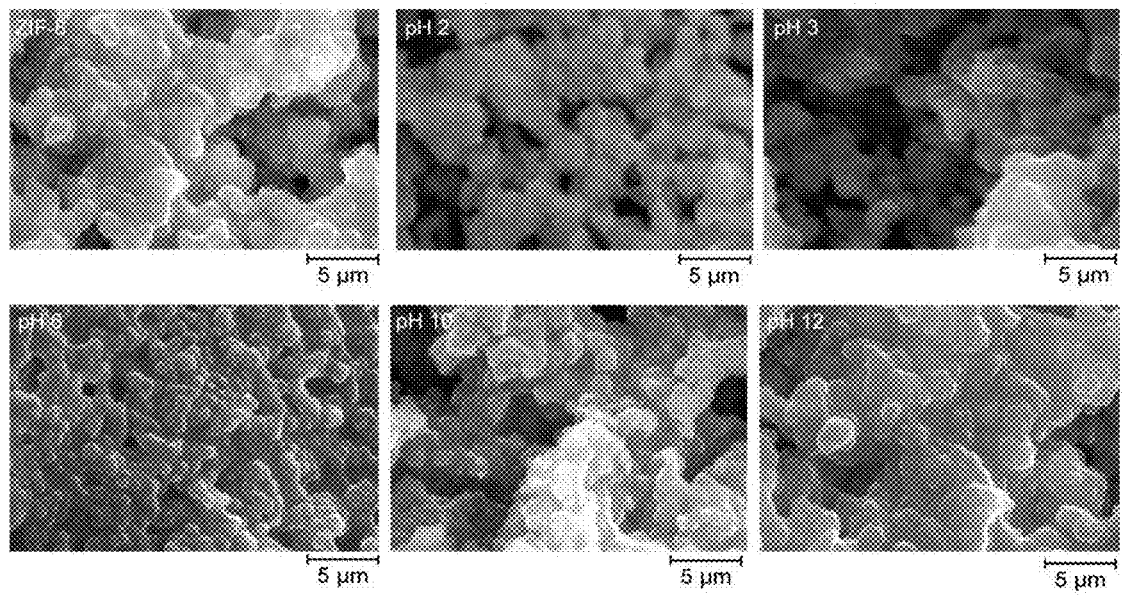
FIG. 9 shows SEM images of ZIF-8 crystals. The images were taken after the treatment at indicated pH values for 24 h.
Figure 10:
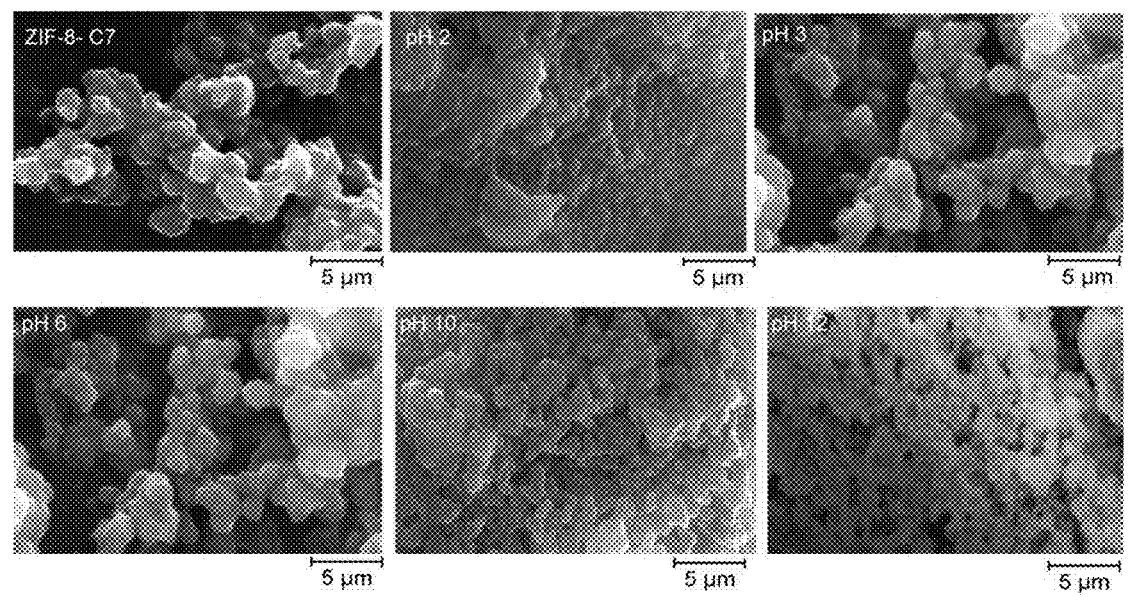
FIG. 10 shows SEM images of ZIF-8—C7 crystals, the images were taken after the treatment at indicated pH values for 24 h.

As-prepared; immersed in pH=2; pH=3; pH=6; pH=10, and pH=12 solutions for 24 h (right). SEM analysis demonstrated that there were no observable alterations in morphology despite exposure to aqueous media across diverse pH values, even at pH levels exceeding 10. This retention of particle morphology persisted even after the removal of organic matter. Additionally, the broad size distribution of the initial material obscured any potential reduction in particle size. However, following treatment at pH 2, both ZIF-8 and C7@ZIF-8 structures experienced complete collapse, as evidenced by conventional techniques depicted in FIGS. 9 and 10. FIG. 9 shows SEM images of ZIF-8 crystals. The images were taken after the treatment at indicated pH values for 24 h.

As is evident from the foregoing description, certain aspects of the present disclosure are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present disclosure.

Moreover, unless defined otherwise, all technical and scientific terms used herein have the same meaning as commonly understood by one of ordinary skill in the art to which the disclosure belongs. Although any methods and materials similar to or equivalent to or those described herein can be used in the practice or testing of the present disclosure, the preferred methods and materials are described above.

REFERENCES

1. Ogurtsova, K., et al., IDF diabetes Atlas: Global estimates of undiagnosed diabetes in adults for 2021. Diabetes Res Clin Pract, 2022. 183: p. 109118.
2. Cho, N. H., et al., IDF Diabetes Atlas: Global estimates of diabetes prevalence for 2017 and projections for 2045. Diabetes Res Clin Pract, 2018. 138: p. 271-281.
3. Sun, H., et al., IDF Diabetes Atlas: Global, regional and country-level diabetes prevalence estimates for 2021 and projections for 2045. Diabetes Res Clin Pract, 2022. 183: p. 109119.
4. Cerf, M., Beta Cell Dysfunction and Insulin Resistance. Frontiers in Endocrinology, 2013. 4.
5. Abedini, A., et al., RAGE binds preamyloid IAPP intermediates and mediates pancreatic β cell proteotoxicity. J Clin Invest, 2018. 128(2): p. 682-698.
6. Association, A. D., Diagnosis and Classification of Diabetes Mellitus. Diabetes Care, 2013. 37(Supplement_1): p. S81-S90.
7. Shaikha S. Alneyadi, A. A. S., Abdou Adem, Naheed Amer and Ibrahim M. Abdou of "cycloheptylamine as anti-diabetic agents" U.S. Pat. No. 11,091,426, 2021.
8. Yao, J., et al., High-yield synthesis of zeolitic imidazolate frameworks from stoichiometric metal and ligand precursor aqueous solutions at room temperature. Cryst Eng Comm, 2013. 15(18): p. 3601-3606.
9. Ordoñez, M. J. C., et al., Molecular sieving realized with ZIF-8/Matrimid® mixed-matrix membranes. Journal of Membrane Science, 2010. 361(1): p. 28-37.
10. Matthews, D. R., et al., Homeostasis model assessment: insulin resistance and beta-cell function from fasting plasma glucose and insulin concentrations in man. Diabetologia, 1985. 28(7): p. 412-9.
11. Khan, S. H., et al., Comparison of various steady state surrogate insulin resistance indices in diagnosing metabolic syndrome. Diabetology & Metabolic Syndrome, 2019. 11(1): p. 44.
12. Bardhan, K., T. Anagnostou, and V. A. Boussiotis, The PD1:PD-L1/2 Pathway from Discovery to Clinical Implementation. Front Immunol, 2016. 7: p. 550.
13. Singh, B. and A. Saxena, Surrogate markers of insulin resistance: A review. World J Diabetes, 2010. 1(2): p. 36-47.

What is claimed is:

1. A system for targeted drug delivery for the treatment of type 2 diabetes, the system comprising:
   an active compound comprising Cycloheptylamine or a pharmaceutically acceptable salt of Cycloheptylamine; and
   a pH-sensitive coating for controlled release of the active compound in the intestines, the pH-sensitive coating comprising a zeolitic imidazolate framework 8 coated with a pH-sensitive alginate,
   wherein:
   the active compound is encapsulated within the pH-sensitive coating, and the active compound within the pH-sensitive coating remains stable in the pH environment of the stomach,
   the pH-sensitive coating releases the active compound in the pH environment of the intestines, and
   the system has a pore size of about 2.5 nm or less.

2. The system of claim 1, wherein the system further comprises one or more excipients.

3. The system of claim 1, wherein the pharmaceutically acceptable salt is Cycloheptylamine hydrochloride (C7).

4. The system of claim 1, wherein the pH of the pH environment of the intestines ranges from about 5.7 to about 7.4.

5. A pharmaceutical composition for treating type 2 diabetes, the composition comprising the system of claim 1.

6. A method of treating type 2 diabetes, comprising administering an effective amount of the composition of claim 5 to a subject in need thereof.

7. The method of claim 6, wherein the system further comprises one or more excipients.

8. The method of claim 6, wherein the pharmaceutically acceptable salt is Cycloheptylamine hydrochloride (C7).

9. The method of claim 6, wherein the subject is a mammal.

10. The method of claim 9, wherein the mammal is a human.

11. The system of claim 1, wherein the pH-sensitive alginate is a pH-sensitive sodium alginate.

* * * * *